US012617498B2

(12) United States Patent
Walther et al.

(10) Patent No.: US 12,617,498 B2
(45) Date of Patent: May 5, 2026

(54) ENVIRONMENTAL BARGE FOR FILTERING OIL FROM WATER IN THE SPILL RESPONSE TO OIL POLLUTION AT SEA

(71) Applicant: FLEX-FEB ApS, Marstal (DK)

(72) Inventors: Jens Walther, Jægerspris (DK); Erik Schmidt, Hørsholm (DK)

(73) Assignee: FLEX-FEB ApS, Marstal (DK)

( * ) Notice: Subject to any disclaimer, the term of this patent is extended or adjusted under 35 U.S.C. 154(b) by 381 days.

(21) Appl. No.: 18/575,510

(22) PCT Filed: Nov. 10, 2022

(86) PCT No.: PCT/DK2022/050239
§ 371 (c)(1),
(2) Date: Dec. 29, 2023

(87) PCT Pub. No.: WO2023/110038
PCT Pub. Date: Jun. 22, 2023

(65) Prior Publication Data
US 2024/0294238 A1 Sep. 5, 2024

(30) Foreign Application Priority Data

Dec. 16, 2021 (DK) .............................. PA202101204

(51) Int. Cl.
*B63B 35/32* (2006.01)
*B63B 35/28* (2006.01)
(Continued)

(52) U.S. Cl.
CPC .............. *B63B 35/32* (2013.01); *B63B 35/28* (2013.01); *E02B 15/046* (2013.01); *E02B 15/104* (2013.01); *Y02A 20/204* (2018.01)

(58) Field of Classification Search
CPC ....... B63B 35/03; B63B 35/28; E02B 15/046; E02B 15/104; Y02A 20/204
See application file for complete search history.

(56) References Cited

U.S. PATENT DOCUMENTS

| | | | |
|---|---|---|---|
| 3,762,558 A | 10/1973 | Anderson | |
| 3,966,614 A | 6/1976 | Ayers | |

(Continued)

FOREIGN PATENT DOCUMENTS

| | | | |
|---|---|---|---|
| KR | 102261121 B1 | 6/2021 | |
| WO | 198400989 A1 | 3/1984 | |

(Continued)

OTHER PUBLICATIONS

International Search Report for corresponding patent application No. PCT/DK2022/050239, dated Feb. 10, 2023, 3 pages.
(Continued)

*Primary Examiner* — John Kim
(74) *Attorney, Agent, or Firm* — PATTERSON INTELLECTUAL PROPERTY LAW, P.C.; Emily A. Shouse

(57) ABSTRACT

Environmental barge with belt skimmer for spill response to oil pollution at sea. The environmental barge consists of an upper part with pontoons and a lower part with a bottom with an integrated hydrophilic filter. The environmental barge is designed so that at least four environmental barges can be stacked inside and on top of each other. Oil-mixed water is guided to the belt skimmer, which carries it up into the environmental barge, where the gravitational principle means that the oil pushes the water through the hydrophilic filter and back into the sea as the barge is filled with oil. The environmental barge can thus be completely filled with oil without increasing the draft. The environmental barge footprint is identical to a standard 20-foot container, and it has container corner castings, allowing significant spill response capacity to be quickly transported and deployed in areas where no other spill response capacity is available. The size of the environmental barge and the constant draft regardless of loading condition mean that the invention is particularly
(Continued)

useful in coastal shallow water areas, marshlands and river deltas.

10 Claims, 11 Drawing Sheets

(51) Int. Cl.
 *E02B 15/04* (2006.01)
 *E02B 15/10* (2006.01)

(56) References Cited

U.S. PATENT DOCUMENTS

| 4,265,757 | A | 5/1981 | Ivanoff |
| 2014/0021113 | A1 | 1/2014 | Caraballo Benitez et al. |

FOREIGN PATENT DOCUMENTS

| WO | 2018199357 | A1 | 11/2018 |
| WO | 2019107587 | A1 | 6/2019 |

OTHER PUBLICATIONS

Danish Search report for corresponding patent application No. PA2021 01204, dated Jul. 8, 2022, 8 pages.

ENVIRONMENTAL BARGE FOR FILTERING OIL FROM WATER IN THE SPILL RESPONSE TO OIL POLLUTION AT SEA

A barge is a vessel with or without its own propulsion, characterized by having a flat bottom and no keel and by the fact that it can float in shallow water.

An environmental barge is defined here as a barge without propulsion that can be used for oil spill response at sea.

A flexible environmental barge is an environmental barge with a hydrophilic filter integrated into the bottom construction.

Shallow water is low water depth. In connection with wave formation, a water depth below ½s of the wavelength.

DESCRIPTION

The invention concerns an environmental vessel for filtering oil from water by spill response to oil pollution at sea.

BACKGROUND

Today, oil spill response at sea is carried out with special ships and special vessels, which have their own propulsion system and are specially designed to contain and collect oil-mixed water. Special vessels are designed for deployment at water depths of more than approx. 5 m, while special vessels (lay water vessels) are flat-bottomed or of the catamaran type, such that they can be deployed at very shallow water depths. Special ships store the collected oil-mixed water in tanks, while lay water vessels often collect oil-mixed water in big-bags, which are thrown overboard for the purpose of later collection from the coast. Only a small part of the collected oil mixed water is oil, so a large part of the storage capacity is used to store water, and it is therefore necessary to have a subsequent filtration in a treatment plant.

An example is described in US 2014/0021113 A1, which describes an environmental vessel that is of a catamaran/barge-like type suitable for filtering oil from water in shallow water, as oil-mixed water is collected and filtered. Once oil-mixed water has been collected and filtered, it is packed in bags and the bags are thrown overboard.

The environmental vessel is of the type that includes two parallel and longitudinal frames, between which a tunnel is defined through which water flows. It has a control bridge and at least one fuel tank, which serves as the main engine.

Patent U.S. Pat. No. 3,762,558 A describes a ship or barge with its own propulsion system, control bridge and fuel tank(s). The draught of the ship and the conveyer is controlled from the control bridge by use of ballast tanks. The surfacing layer of pollutant is received in an internal tank. Oil, generally of the crude oil and heavy type, is collected by the flow over the edge of this tank thereby being separated from water and collected in a second internal tank. The water is pumped out from the bottom of the first internal tank and the oil from the second is transferred into a tanker. The endless belts of the conveyer are driven by a link chain and a motor mounted into the bow of the barge. The ship or barge is mechanical complex.

U.S. Pat. No. 3,762,558A describes a conveyor arrangement for picking up floating pollutant such as oil at sea. The conveyor system is pivoted onto the bow of a barge or similar boat. The polluted sea water is conveyed upwardly and drops into tanks. Water ballast tanks are used to balance the dipping depth of the barge or boat depending on the how much the conveyor belt end sticks into the body of sea water.

Oil spill response worldwide can become more effective if its costs are lower. Both the acquisition, operation and cargo of an environmental vessel are very costly. It therefore makes good socio-economic sense to have an environmental vessel that is both cheap in acquisition, operation and cargo.

This problem has been solved by the provision of an environmental vessel according to the present invention.

SUMMARY DESCRIPTION

An environmental vessel for oil spill response at sea, which is both cheap in acquisition, operation and in cargo, comprises two longitudinal pontoons, each of which has horizontal and vertical sides, which together form a watertight space, vertical transverse sides, where the longitudinal pontoons are longer than the transverse sides, where the vertical and vertical transverse sides are connected to other vertical sides, and, together with a bottom with a filter, forms a sump where the environmental vessel is an environmental barge without propulsion and has a double bottom with an integrated hydrophilic filter and on which a belt skimmer can be attached to the environmental barge.

An embodiment of the environmental barge is where the environmental barge sump is designed so that the sump has a larger cross-section of the upper part than the cross-section of the lower part, and where the lower part of the sump of a first environmental barge fits into the upper part of the sump of another environmental barge so that at least four environmental barges can be stacked inside and on top of each other.

An embodiment of an environmental barge is where the environmental barge has removable baffle bulkheads and removable deck plates.

An embodiment is also where a first environmental barge's sump fits into another environmental barge's frame so that at least 4 environmental barges can be stacked on top of each other.

An embodiment of this is where the volume of the sump of the environmental barge is maximized.

Another embodiment is where the environmental barge has at least one fastener for mounting a belt skimmer.

Embodiments are also in which the hydrophilic filter is centrally located in the double bottom of the sump.

An embodiment can be made preferably of aluminum; another again is where the footprint of the environmental barge's frame has the same external dimensions as the bottom area of a standard 20-foot container.

An embodiment of an environmental barge in which the environmental barge has a footprint like a 20-foot container, and where four, inside and on top of each other, stacked environmental barges on a transport frame have the same external dimensions as a standard 20-foot container, and where a belt skimmer can be contained in the free volume between the 4 stacked environmental barges.

BRIEF DESCRIPTION OF THE DRAWINGS

In order for the invention to be more easily understood, some non-limiting examples of embodiments will now be described in detail with reference to the figures in which.

DETAILED DESCRIPTION

Figure 1:
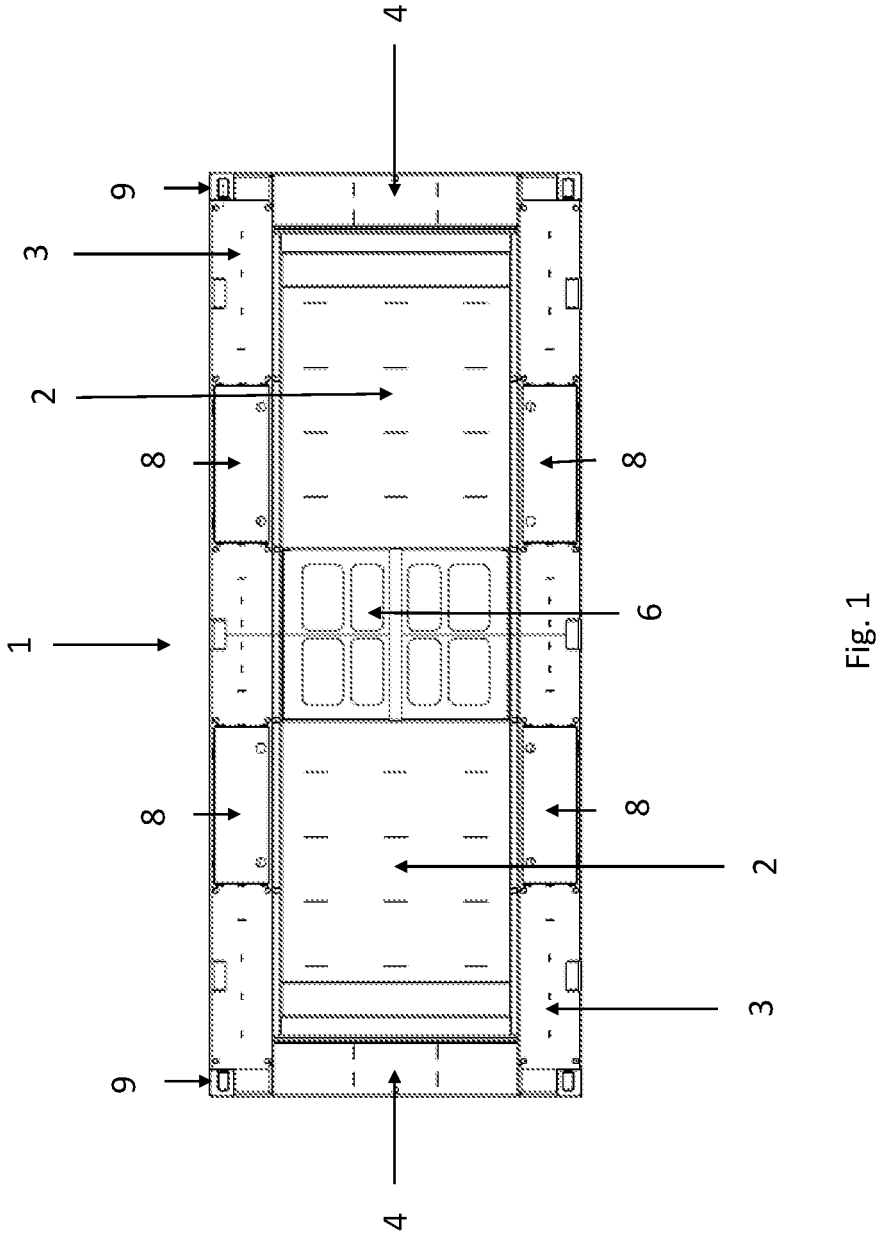
FIG. 1. An environmental barge according to the invention seen from above.
Figure 2:
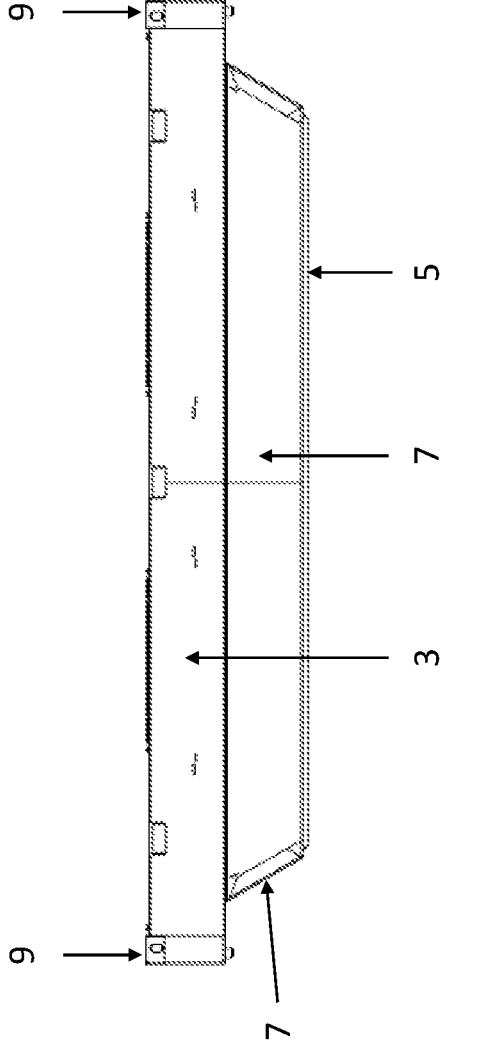
FIG. 2. An environmental barge as shown in FIG. 1 seen from the side.
Figure 3:
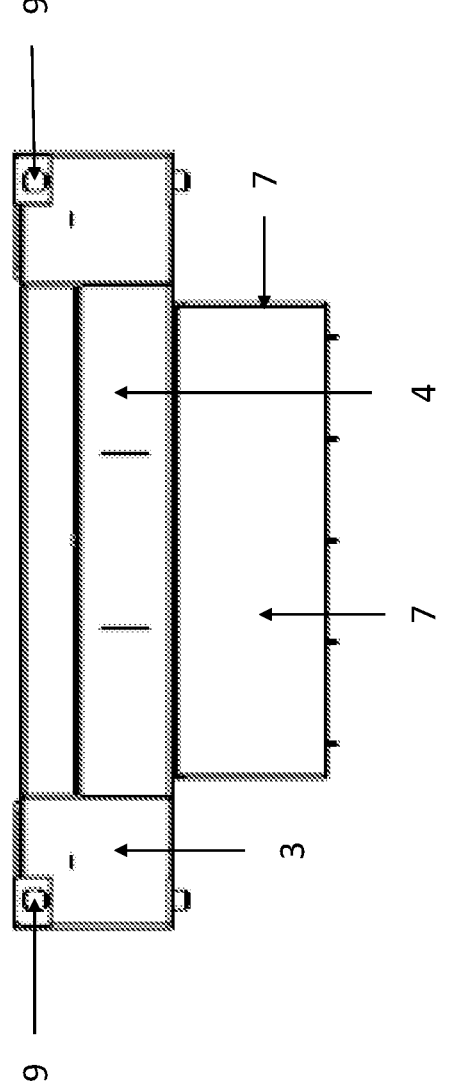
FIG. 3. An environmental barge as shown in FIG. 1 seen from the front.

The environmental barge as shown in FIGS. 1-3 includes an upper part comprising a frame (1) and a lower part comprising a bottom sump (2). The frame consists of two longitudinal pontoons (3) and two transverse pontoons (4). The pontoons have horizontal and vertical sides, which form waterproof spaces that provide the environmental barge with buoyancy. The longitudinal pontoons are longer than the transverse pontoons. The sump is made up of a double bottom (5) with a centrally located integrated hydrophilic filter (6) and with sides (7) connecting the bottom to the longitudinal pontoons and the vertical transverse sides.

In the longitudinal pontoons there are battery compartments (8), and in each of the four corners of the environmental barge there is an ISO corner casting (9) so that the environmental barge can be handled with standard container equipment.

Figure 4:
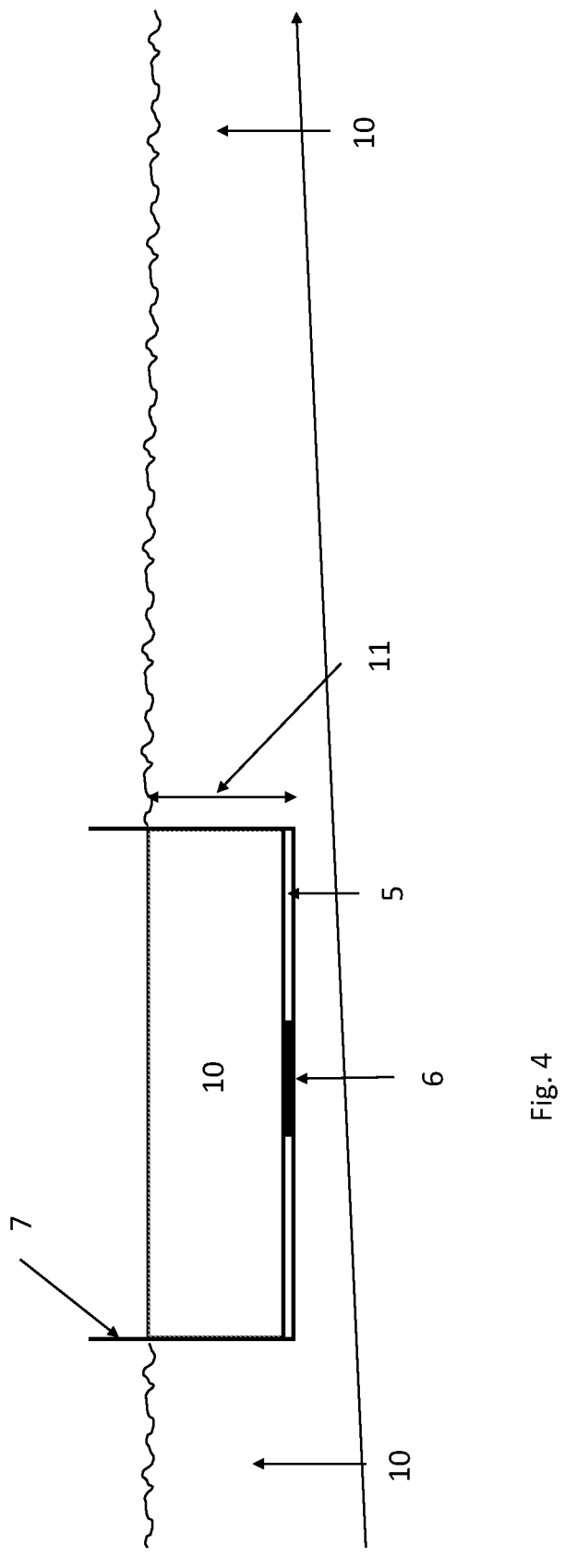
FIG. 4. A water-filled environmental barge as shown in FIG. 1.
Figure 5:
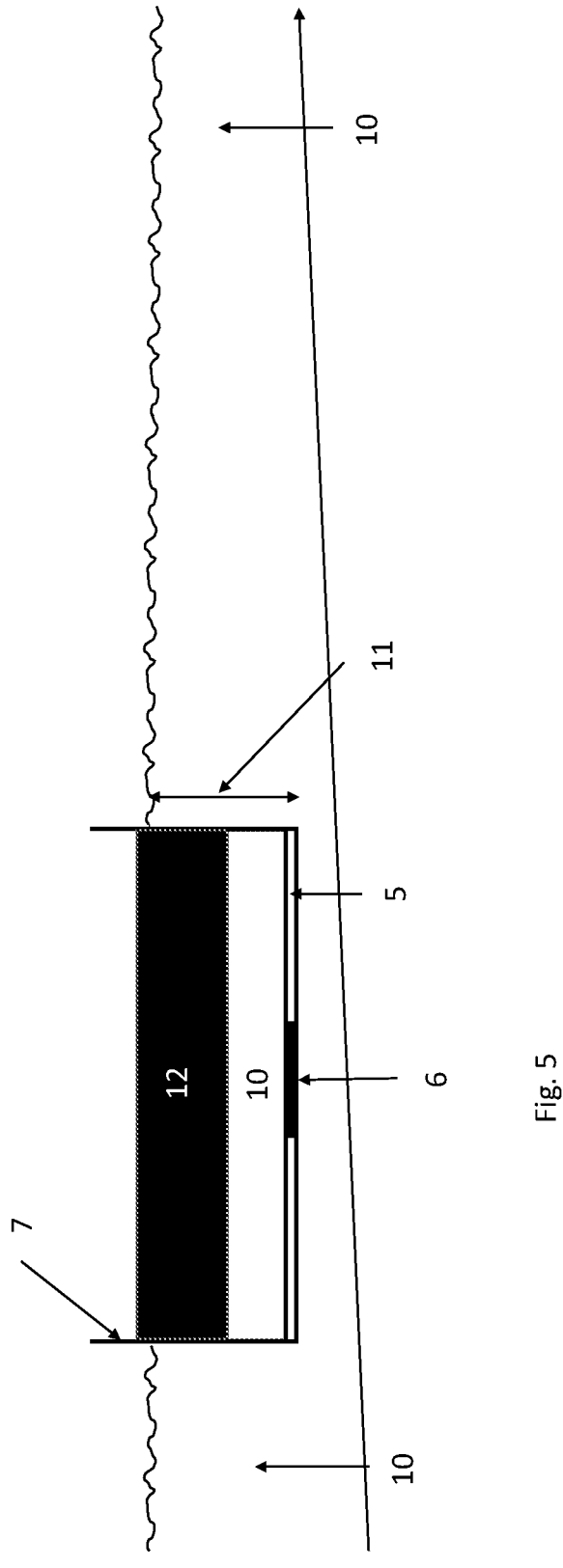
FIG. 5. An environmental barge as shown in FIG. 1 partly filled with oil-mixed water.
Figure 6:
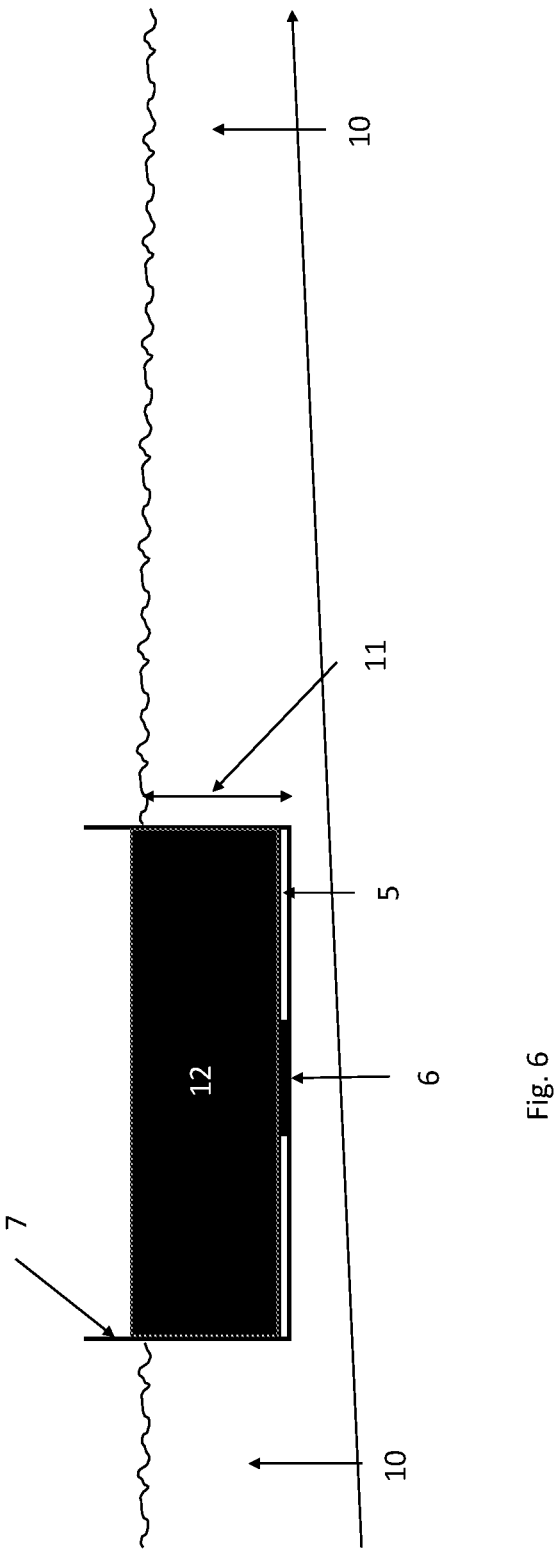
FIG. 6. An environmental barge as shown in FIG. 1 completely filled with oil-mixed water.

FIGS. 4-6 provide a sketch of principles of the operation of the environmental barge.

FIG. 4 shows the environmental barge before it is filled with oil-mixed water. Since the seawater (10) can move freely through the hydrophilic filter, the environmental barge and the surrounding sea form two connected vessels, so there will be the same water level inside the environmental barge as there is in the surrounding sea. The environmental barge is shown on shallow water with a sloping seabed, where the environmental barge's draft (11) is plotted.

FIG. 5 shows the environmental barge during filling with oil-mixed water. Oil (12) is lighter than water and will therefore be at the top of the environmental barge. Since the air pressure is the same on top of the oil in the environmental barge as it is on the sea outside the environmental barge, and since oil is lighter than water, a larger volume of oil is needed to balance the amount of water that has been displaced through the bottom of the environmental barge. Therefore, the oil inside the environmental barge will stand higher than the surrounding sea. The draft will remain unchanged, as there are still two connected vessels.

FIG. 6 shows the condition in which the flexible environmental barge is just filled with oil. So much oil-mixed water has been filled in the environmental barge that the oil just touches the hydrophilic filter material and has displaced all the water. The oil level has risen further, but the draft is the same in this balance state.

If more oil-mixed water is filled into the environmental barge, the hydrophilic filter will be saturated with oil, the filter will stop and close the bottom of the sump, increasing the total mass of the environmental barge and contents, as well as increasing the draft of the environmental barge.

Comparing FIGS. 4, 5 and 6 it is seen that the hydrophilic filter at the bottom allows the environmental barge's draft (11) to be constant regardless of loading condition due to the free flow of water between the environment barge's interior and the surrounding sea, just as it applies to connected vessels. The draft does not increase when the environmental barge is loaded with oil-mixed water, as the water can pass the hydrophilic filter (10). The oil (12) is retained. As in FIGS. 5 and 6, the oil (12) is lighter than water and floats on top.

The load capacity is utilized to the maximum, as the oil water mixture is filtered/the separation is completed in the environmental barge; there is not used any load capacity to store water.

The flexible environmental barge has a large load capacity due to its shape and because there is no machinery, fuel tanks or crew facilities to occupy loading space. The shape also means that the hydrodynamic properties are relatively poor, but this is not a limiting factor, as the collection of the oil-mixed water takes place at very low speeds.

Figure 7:
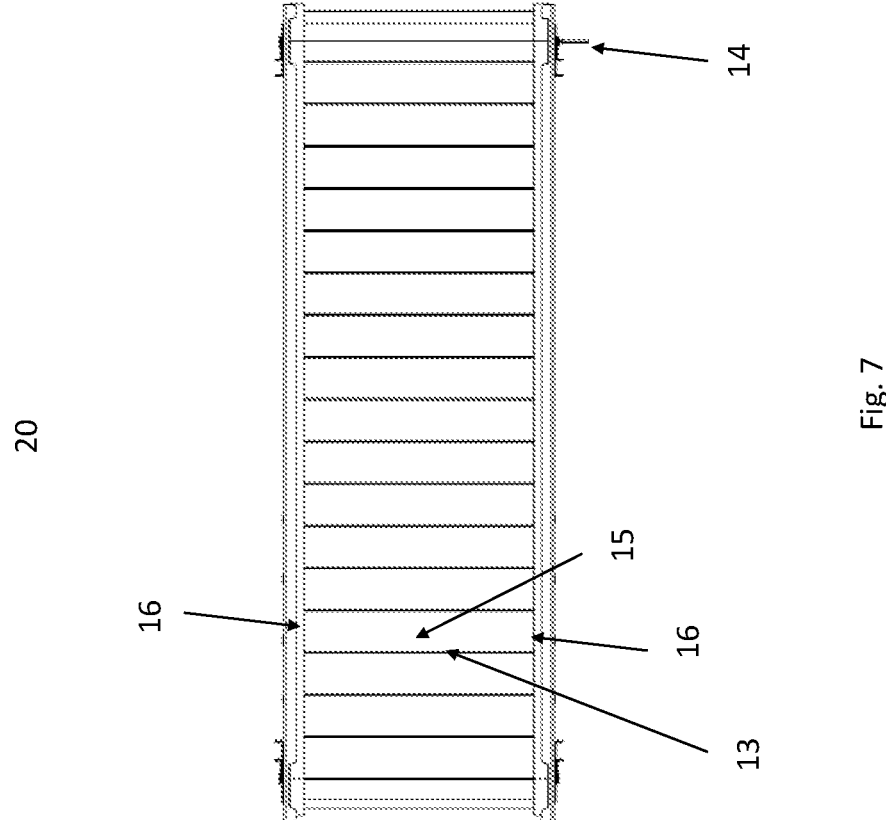
FIG. 7. Electrically powered belt skimmer.

The environmental barge is configured to be equipped with an electrically powered belt skimmer, as illustrated in FIG. 7. The belt skimmer comprises a skimmer belt that has fixed movers (13), which are approximately 5 cm high, often a plastic piece, perpendicular to the skimmer belt, and an electric drum motor (14) powered by batteries in the battery compartments of the longitudinal pontoons. The bottom of the skimmer belt (15), together with the fixed movers, forms a number of boxes, generator boxes, that lift the oil-comprising water into the environmental barge, where it is filtered. The sides (16) of the skimmer belt are flexible and often wave-shaped, as they have to be stretched and or elongated when running around two drums one at each of the two ends. The fixed mover boxes lift the oil-comprising water into the environmental barge, where it is filtered. The skimmer is a light construction that is designed so that it can be handled without mechanical aids. With this technique, where filtration takes place immediately in the environmental barge itself, it is possible to handle even very thin oils. Since the belt skimmer is electrically powered by batteries and the number of mechanical parts is very few, problems with wear and tear of mechanical parts are reduced. It also takes up less space than other known belt skimmers, which is important during cargo.

Figure 8:
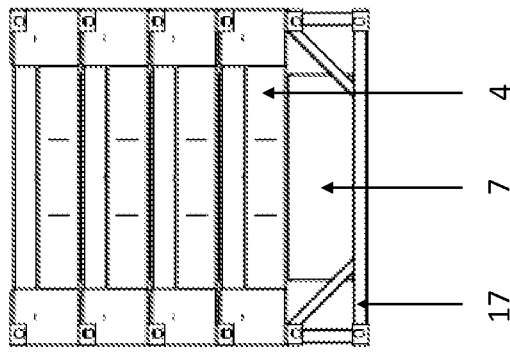
FIG. 8. Environmental barges as shown in FIG. 1 stacked on a transport frame.
Figure 8:
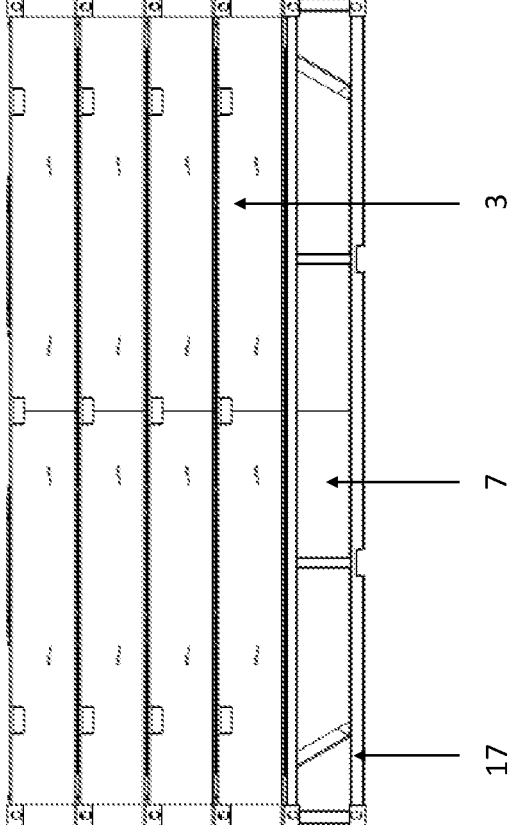

The environmental barges are preferably designed so that one environmental barge's sump fits into another environmental barge's frame and so that four environmental barges can be stacked on a transport frame (17) as shown in FIG. 8. If the environmental barges have the same footprint as a 20-foot ISO container, four environmental barges on a transport frame will have the same dimensions as a 20-foot ISO container.

Figure 9:
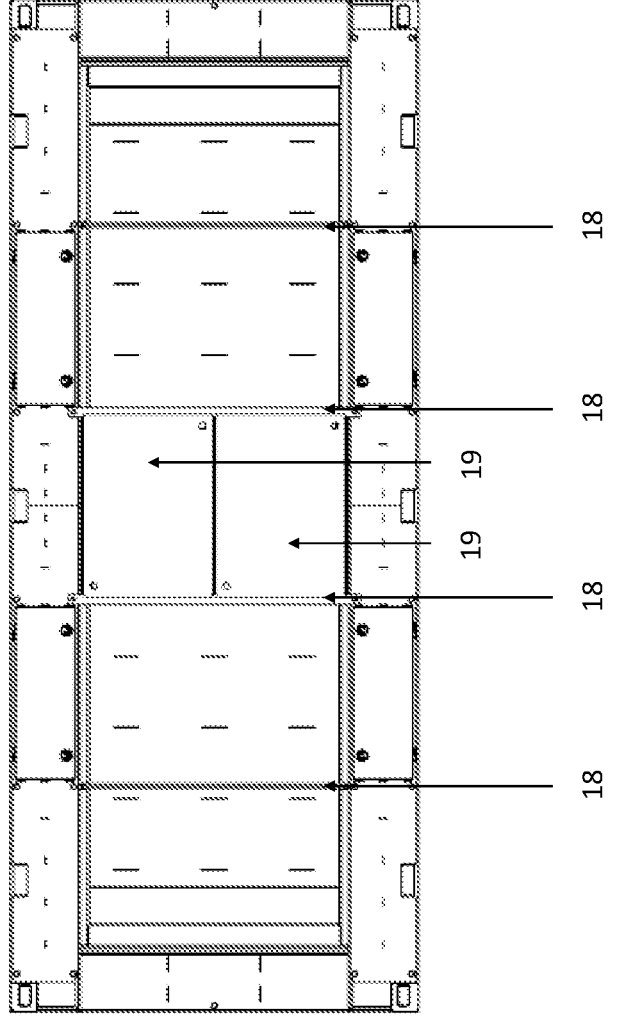
FIG. 9. Environmental barge as shown in FIG. 1 with baffle bulkheads and deck plates.

The environmental barge has baffle bulkheads (18) and deck plates (19), as shown in FIG. 9. Deck plates and baffle bulkheads can be stowed on the bottom of the environmental barge during transportation.

Figure 10:
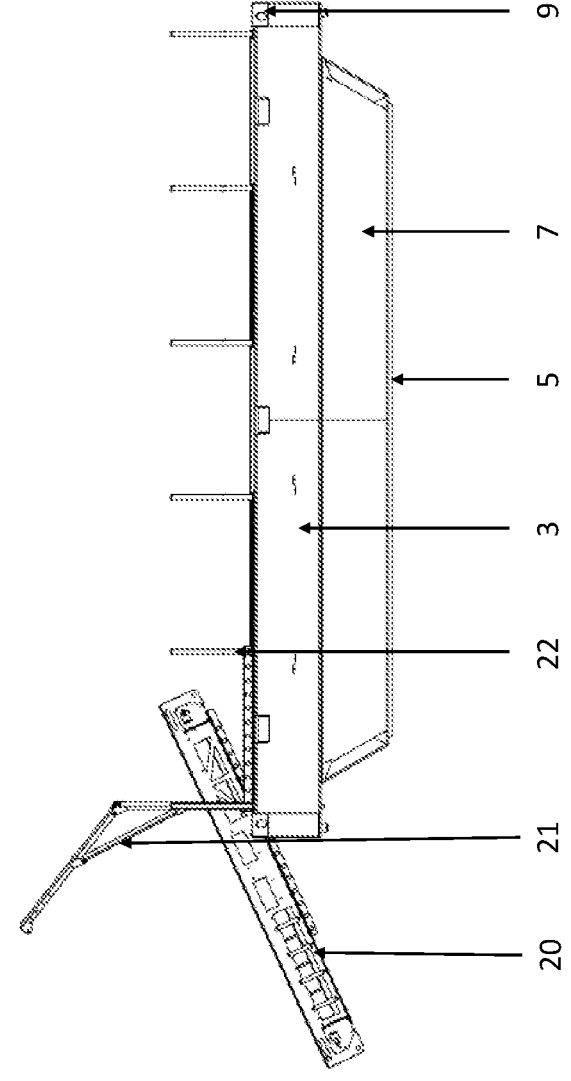
FIG. 10. Environmental barge as shown in FIG. 1 with belt skimmer.

FIG. 10 shows the environmental barge with mounted track skimmer (20), crane (21) for handling the skimmer and stanchions (22) for safety lines.

Figure 11:
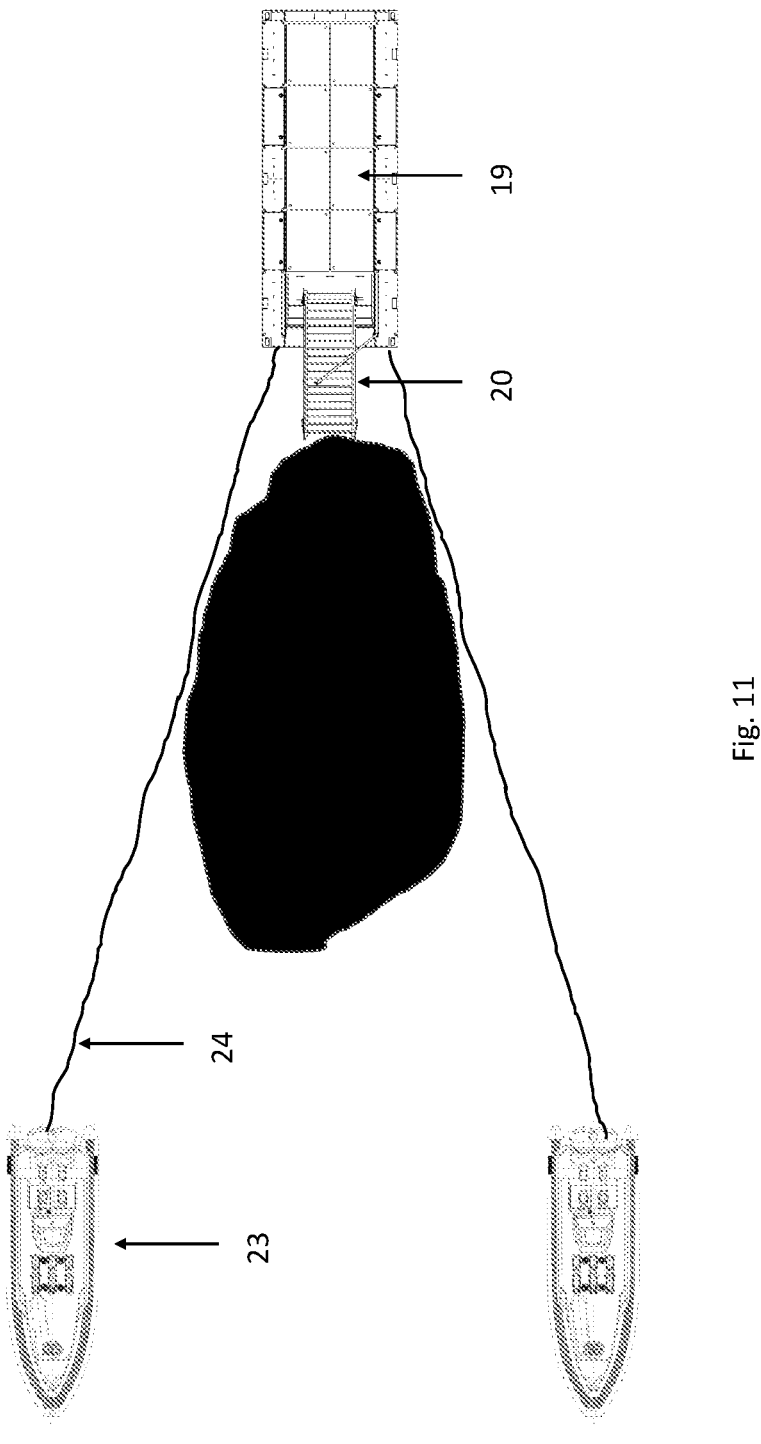
FIG. 11. Environmental barge as shown in FIG. 1 towed by two smaller vessels.

FIG. 11 shows the environmental barge hauled by two smaller vessels (23) in booms (24) forming a funnel.

Oil-containing water is led by the booms to the environmental barge's belt skimmer, which lifts it up into the environmental barge, where it is filtered. As more and more oil-containing water is fed into the environmental barge, the water will be squeezed out through the hydrophilic filter that is part of the environmental barge's bottom construction, and the oil will remain in the environmental barge, which can then, when the environmental barge is almost filled with oil, be towed to shore or to a ship that has the tank capacity to empty it. The environmental barge can then resume the collection of oil.

The deck plates prevent the oil from overflow when the filled environmental barge has to be towed to a tank plant to be emptied. At the same time, the deck plates are designed with a strength so that one can walk on them and one can therefore also use the environmental barge as a working platform for port and diving work.

The baffle bulkheads reduce the effect of the free liquid surfaces and are designed so that the oil-mixed water can be distributed throughout the length of the environmental barge.

If the oil comes into contact with the filter material, the filter may stop. The hydrophilic filter therefore consists of two separate filter elements that can be replaced separately, and which can be replaced while the environmental barge is in the water.

In principle, the environmental barge can be used to collect all kinds of surface waste and, in addition to oil-mixed water, also collect plastic waste, chemical products as well as seaweed, eelgrass, grease dung and jellyfish. The environmental barge can also, when not used to collect surface waste, be used as a working platform in ports, etc. Finally, the environmental barge is flexible in terms of transport and logistical mobility, as the ISO container format ensures that the environmental barge can be transported anywhere in the world by truck, train, plane or ship, as well as being flexible in terms of choice of manufacturing material. If you need a very light environmental barge, it can be made of composite material or aluminum. A smaller environmental barge made of aluminum will weigh less than 1000 kg and will therefore also be able to be slung by helicopter to areas where other types of spill response capacity cannot be carried. If the weight does not have to be considered, the environmental barge can be made of steel.

With the technique applied, the entire internal volume of the environmental barge will be utilized for storing oil. Thus, it is a 100% efficient volume utilization, where traditional systems typically only have a volume utilization of perhaps 20%.

Since the draft of the environmental barge does not change during filling, there will be no need to adjust the height of skimmers or booms while collecting oil-mixed water. It allows for a simple and robust design with few moving mechanical parts.

As an alternative to hauling the environmental barge, it can be anchored in the booms so that the ocean current directs the oil-filled water to the environmental barge.

The size of the environmental barge and its constant draft construction regardless of loading condition make it particularly useful on shallow water, where the load capacity can be used very efficiently. Such environmental barges are therefore particularly useful in marshes and river deltas, where known spill response methods—often with very little capacity to store the collected oil—are insufficient.

No other similar techniques are known where an internal stackable environmental barge with an integrated hydrophilic filter uses the open connected vessels techniques to filter oil from water.

Patent CN106240761 A describes a ship equipped with a reusable filter that can absorb oil from contaminated water with a tank open at the top. The tank is filled from the top with oil-contaminated water, after which it is waited until the oil has accumulated on top of the water. Then the filter is lifted with a spring system up towards the oil and absorbs it. When the filter is saturated with oil, it is pushed up into a roller and press system, which squeezes the oil out of the filter and directs the oil to a reservoir. The water under the filter is directed from the bottom of the tank to the surface.

The present patent application concerns an environmental barge with a hydrophilic filter, which is not intended to absorb the oil, but to allow the water to pass through the filter and back into the sea.

The invention allows a continuous filling of the environmental barge, as there is only a need to clean the filter if the environmental barge is overfilled.

US2011309006 and US2012048789 deal with filter elements that are both lipophilic and hydrophilic, but these filter elements are not an integral part of a vessel or environmental barge.

Typically, a bag/trawl with a filter element at the end of the bag/trawl is used.

WO 2019/107587 describes a catamaran-type vessel where the gravitational principle is used to separate water from oil. A belt skimmer carries the oil-water mixture to a vessel, where water is led back into the ocean through a hydrophilic filter located at the ends of the vessel.

The present patent application concerns an environmental barge where the cross-section of the area around which the frame surrounds is greater than the cross-section of the sump, and where the bottom sump of a first environmental barge fits into the frame of another environmental barge so that at least four environmental barges can be stacked inside each other, and where the hydrophilic filter is placed centrally and is part of the environmental barge's bottom construction. The belt skimmer is designed so that even very thin oils are fed into the environmental barge. Thus, no pre-filtration takes place on the skimmer; the entire filtering process takes place in the environmental barge itself.

The invention is considered to be economically attractive both in terms of purchase price and ongoing operating costs.

Preliminary calculations on acquisition prices show that the volume price of collected oil is only about $\frac{1}{20}$ of the price when using previously known technology. This is because the flexible environmental barge is a spill response capacity separate from the intervention units (vessels and ships) that haul the environmental barge.

The operation costs are also very low, as there is no need for personnel on board of the environmental barge, as the fixed draft of the environmental barge means that there is no need to adjust skimmers or booms during the collection process, and as the collection equipment can be controlled remotely.

The construction of the environmental barge is simple, which is why there is also no great need for education and training of a crew in order to use the environmental barge.

The simple and robust design with few moving mechanical parts also means low repair costs and safe operation. At the same time, the simple and light belt skimmer makes it possible to transport 4 barges with all equipment including a belt skimmer in a standard 20 ft container.

The membrane solution for the hydrophilic filter shall, preferably, match the performance specifications given below:

Hydrophilic properties
Surface area max. 1 m$^2$
Capacity 250 l/min
Gravity driven filtration process
Optimally from only a filtration performance point of view the filter should be hydrophilic and oleophobic.

The applied hydrophilic filter in the successful tests above with the barge is Ultra-X-Tex from UltraTech International Inc.

| The data on Ultra-X-Tex are | | | |
|---|---|---|---|
| Permeability | ASTM D-4491 | cm/sec | 0.72 |
| Flow Rate | ASTM D-4491 | gal/ft$^2$/min. (l/m$^2$/min.) | 151 (6152) |
| Apparent Opening Size/μm | ASTM D-4751 | μm U.S. Sieve | 100 140/150 |
| Hydrocarbon Capacity (nominal) | | gal/yd$^2$ (l/m$^2$) | 0.70 (3.17) |

It is a textile filter. It will let the water run through and in case the sump is overfilled it will also absorb the oil in the filter textile, which however can be cleaned.

REFERENCE FIGURES

1. Environmental barge.
2. Sump.
3. Two longitudinal pontoons.
4. Two transverse pontoons.
5. Double bottom.
6. Hydrophilic filter.
7. Sides in sump.
8. Battery compartment.
9. Corner casting
10. Seawater.
11. The draft of the environmental barge.
12. Oil in the environmental barge.
13. Fixed movers on belt skimmers.
14. Electric drum motor.
15. The bottom of the skimmer belt.
16. The flexible sides of the skimmer belt.
17. Transport frame.
18. Baffle bulkheads.
19. Deck plates.
20. Belt skimmer.
21. Crane for handling skimmer.
22. Stanchions for safety lines.
23. Vessel.
24. Boom.

The invention claimed is:

1. An environmental barge for filtering oil from water in the control of oil pollution at sea, comprising one upper and one lower part,
wherein the upper part of the environmental barge comprises a frame comprising two longitudinal pontoons and two vertical transverse pontoons, the pontoons have horizontal and vertical sides which together form a watertight space, and the longitudinal pontoons are longer than the transverse pontoons;
wherein the lower part of the environmental barge comprises a bottom sump consisting of a watertight bottom of the bottom sump with a filter and with sides connecting the bottom with the longitudinal pontoons and the vertical transverse pontoons; and
wherein the environmental barge is an environmental barge without propulsion, and where the bottom of the bottom sump is a double bottom with an integrated hydrophilic filter and the environmental barge is configured for mounting a belt skimmer.

2. The environmental barge according to claim 1, wherein a cross-section of the area which the frame surrounds is larger than a cross-section of the largest cross-section of the bottom sump, and wherein a first environmental barge's bottom sump fits into the frame of another environmental barge so that at least four environmental barges can be stacked inside and on top of each other.

3. The environmental barge according to claim 2, wherein the first environmental barge is designed so that the larger cross-section of the frame of the environmental barge matches the cross-section of the second environmental barge at a distance that allows the setting down and taking up the second environmental barge in and from the first environmental barge, while maximizing the volume of the bottom sump.

4. The environmental barge according to claim 1, wherein the environmental barge comprises a cross pontoon or a transverse pontoons at each end with at least one fastener for mounting a belt skimmer.

5. The environmental barge according claim 1, wherein the filter is a centrally located hydrophilic filter integrated into the double bottom of the environmental barge.

6. The environmental barge according to claim 1, wherein the longitudinal pontoons, transverse pontoons or bottom sump of the environmental barge are made of aluminum.

7. The environmental barge according to claim 1, wherein the environmental barge's footprint is identical to a standard 20-foot container.

8. The environmental barge according to claim 1, wherein four stacked environmental barges on a transport frame have the same external dimensions as a standard 20-foot container.

9. The environmental barge according to claim 1, wherein the environmental barge has one or more of the following removable baffle bulkheads or removable deck plates.

10. The environmental barge according to claim 1, wherein the environmental barge is configured with a removable electrically driven, belt skimmer with fixed movers that can be accommodated in the free volume of the environmental barge by stacking four environmental barges inside and on top of each other.

* * * * *